Oct. 5, 1943.   A. N. MILSTER   2,331,214
BRAKING SYSTEM CONTROL MEANS
Filed June 12, 1942    2 Sheets-Sheet 1
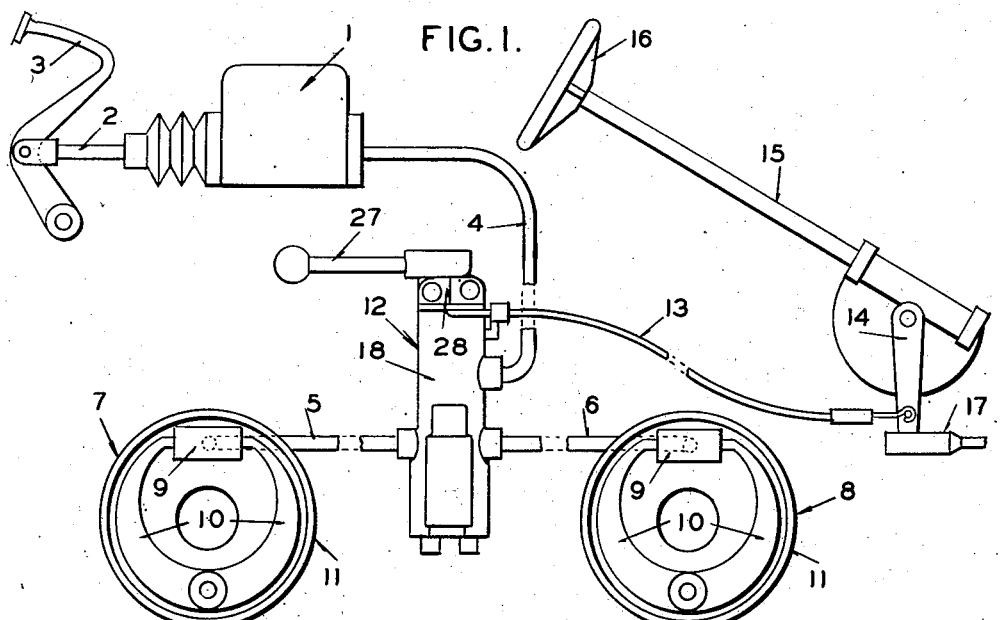
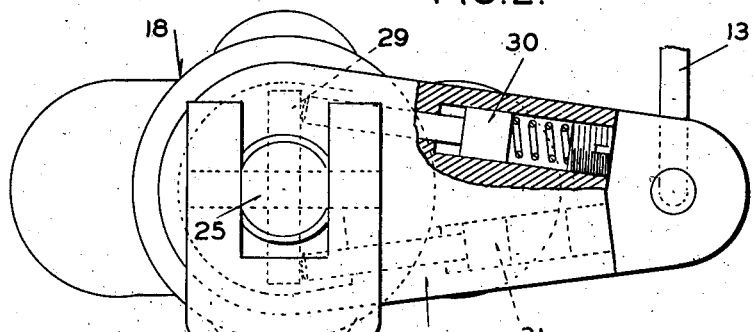
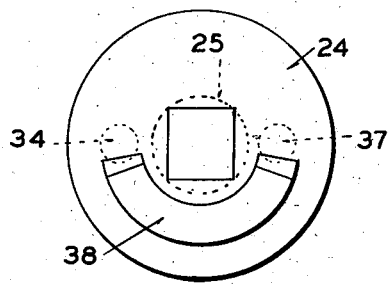
INVENTOR
A. N. MILSTER
BY
ATTORNEY Oct. 5, 1943.  A. N. MILSTER  2,331,214
BRAKING SYSTEM CONTROL MEANS
Filed June 12, 1942   2 Sheets-Sheet 2
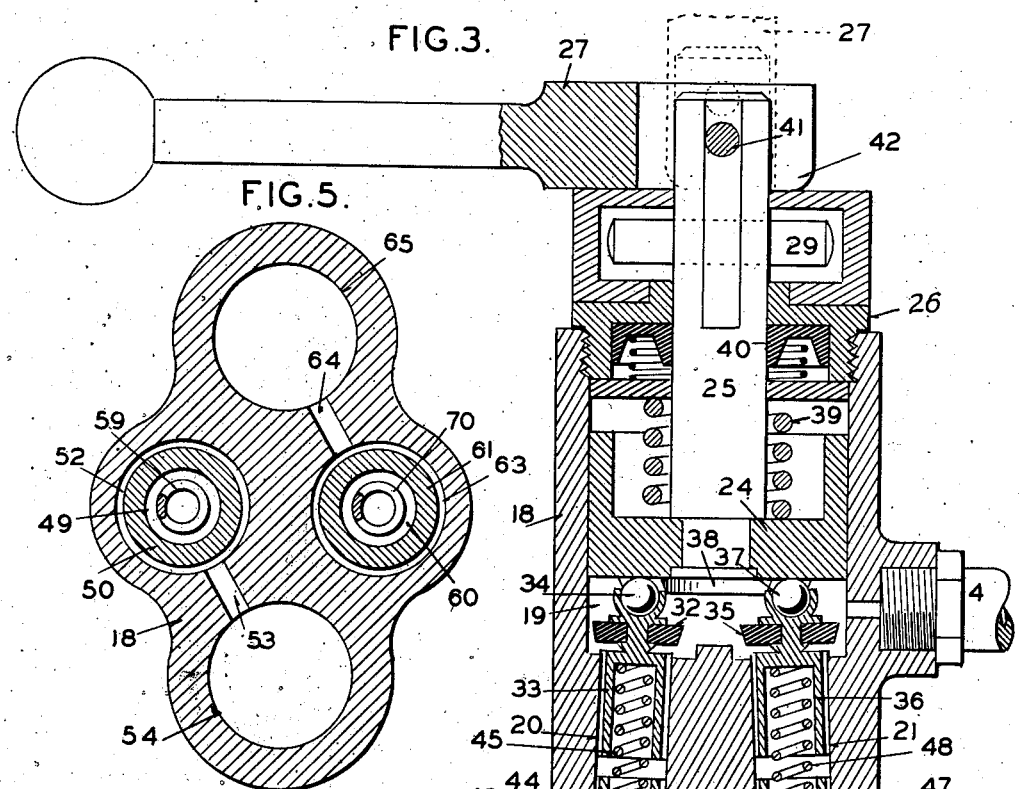
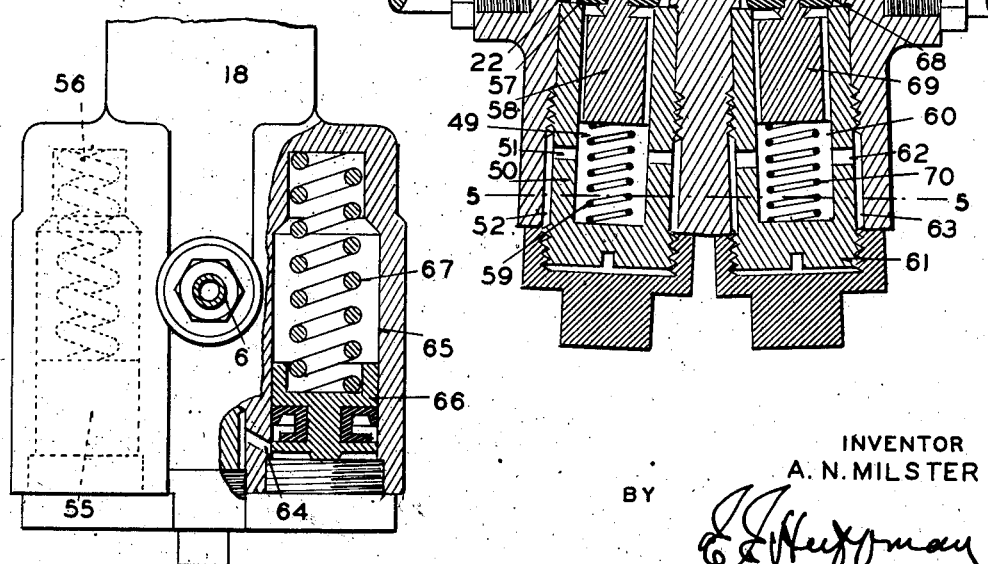
INVENTOR
A. N. MILSTER
BY
ATTORNEY Patented Oct. 5, 1943

2,331,214

UNITED STATES PATENT OFFICE 2,331,214

BRAKING SYSTEM CONTROL MEANS

Arthur N. Milster, Ferguson, Mo., assignor to Wagner Electric Corporation, St. Louis, Mo., a corporation of Delaware Application June 12, 1942, Serial No. 446,690

17 Claims. (Cl. 180—18)

My invention relates to a fluid pressure system and more particularly to one for controlling the brakes of a vehicle.

One of the objects of my invention is to produce an improved braking system for a vehicle which will permit the operator to employ the brakes to assist in steering the vehicle.

Another object of my invention is to provide improved valve means for a vehicle braking system which will be automatically controlled by the steering mechanism of the vehicle so that braking can be accomplished in a manner to aid in the steering and to also associate with the valve means, a manual control for over-riding the automatic control.

Still another object of my invention is to so construct a valve means of the type above referred to that it can also be manually-controlled to trap fluid pressure in the brake actuating motors and place said motors in communication with pressure accumulator means to thereby provide a parking brake system for the vehicle.

Other objects of my invention will become apparent from the following description taken in connection with the accompanying drawings in which Figure 1 is a schematic view of a braking system for a vehicle having my invention embodied therein; Figure 2 is a top view of the valve structure, parts being shown in section; Figure 3 is a longitudinal sectional view of the valve structure; Figure 4 is a rear view of a portion of the valve showing one accumulator in section; Figure 5 is a sectional view taken on the line 5—5 of Figure 3; and Figure 6 is a bottom view showing the control cam on the piston.

Referring to the drawings and first to Figure 1, there is disclosed a master cylinder device 1 of known construction, the piston thereof (not shown) being actuated by a rod 2 and a pedal 3. The outlet of the master cylinder communicates with a conduit 4 to supply fluid to branch conduits 5 and 6, the former leading to the left hand brake assembly 7 of the vehicle and the latter leading to the right hand brake assembly 8 of the vehicle, each of said brake assemblies comprising a fluid motor 9 for actuating brake shoes 10 into engagement with a drum 11. Interposed between conduit 4 and branch conduits 5 and 6 is my improved valve construction generally indicated by the numeral 12 whereby the operation of the brakes can be controlled so that they may be used to aid in steering. This valve mechanism is connected to be controlled by the steering mechanism on the vehicle, said connection comprising a Bowden wire 13 having one end connected to a movable part of the valve and the other end connected to the steering arm 14 at the lower end of the steering column 15, the upper end of said column being provided with the usual steering wheel 16. A drag link 17 leads from the steering arm to the dirigible wheels of the vehicle.

Referring now to Figures 2 to 6, the details of the control valve mechanism 12 will be described. The parts of the valve mechanism are enclosed within a casing 18, the upper end of which is provided with a cylindrical bore 19 from which two passages 20 and 21 extend downwardly to place bore 19 in communication with two chambers 22 and 23. The lower end of bore 19 has connected thereto the previously referred to conduit 4 which is connected to the outlet of the master cylinder device and chambers 22 and 23 are connected to conduits 5 and 6, respectively, leading to the left and right hand brakes.

Within bore 19 is positioned a rotatable and reciprocable piston 24 secured to a shaft 25 which extends to the exterior of the casing through a closure plug 26. On the outer end of this shaft is provided a handle 27 and interposed between the handle and the plug is an arm 28 to which is connected the Bowden wire 13 forming the connection between the valve and the steering mechanism. The arm 28 is adapted to rotate shaft 25 through a yieldable connection, which is yieldable only when shaft 25 is desired to be rotated by handle 27. The yieldable connection comprises a pin 29 carried by shaft 25 and projecting on opposite sides of said shaft. On the arm are two yieldable plungers 30 and 31, one of which is adapted to press against one end of pin 29 and the other against the other end of pin 29. The springs of plungers 30 and 31 are of such strength that the arm can normally rotate shaft 25 in accordance with the movement of the steering arm 14. However, when it is desirable to rotate shaft 25 by the handle 27, such can be done at any time by merely turning the handle with sufficient force that the spring of one plunger can be compressed.

The entrance to passage 20 from bore 19 has associated therewith a valve element 32 for closing off said passage. This valve element is carried by a fluted plunger 33 guided in passage 20. The plunger projects into bore 19 and carries a ball 34 on the end thereof. In a like manner the entrance to passage 21 has a valve element 35 for cutting off communication between bore 19 and the passage, said element being carried by a fluted plunger 36 guided in passage 21 and having mounted on its upper end a ball 37. The balls 34 and 37 are adapted to abut against the face surface of piston 24 and to be actuated by a cam 38 (Figure 6) on said piston face. This cam is so arranged that neither ball will be engaged thereby when the piston is in one position. However, when the piston is turned in a clockwise direction from such position, as viewed from the top, the cam 38 will engage ball 37 to force the valve element 35 to a seated position and thus prevent any communication from conduit 4 to conduit 6. When the piston is turned in a counter-clockwise direction, then cam 38 will move the valve element 32 to a seated position to close off communication between conduit 4 and conduit 5. Interposed between piston 24 and plug 26 is a strong spring 39 which biases shaft 25 and the piston to their normal positions and insures that the piston will be maintained in such a position that when the shaft is turned, cam 38 will properly control the valve elements. A packing cup 40 seals the upper end of the shaft with the plug.

The piston 24 is adapted to be moved upwardly against the bias of the spring by handle 27. This is accomplished by turning the handle upwardly so that it will be axially aligned with shaft 25. As the handle is moved about its pivot pin 41, a rounded portion 42 on the end thereof cooperates with the top of arm 28 to accomplish a cam lifting action whereby shaft 25 and piston 24 will be raised so that cam 38 will be moved to a position where it can no longer cooperate with the balls of the valve elements 32 and 35.

The lower end of passage 20 leading into chamber 22 is controlled by a valve element 43 carried on a fluted plunger 44 guided in the passage. Interposed between this plunger and plunger 33 of the valve element 32 is a spring 45 which acts to spread the two plungers apart. When the valve element 32 is seated plunger 44 will be forced downwardly and the valve element 43 held unseated. Similarly the lower end of passage 21 entering chamber 23 is controlled by a valve element 46 carried on the end of a fluted plunger 47 guided in the passage. Between this plunger 47 and plunger 36 which carries the valve element 35 is interposed a spring 48 acting to move the plungers apart. When the valve element 35 is seated plunger 47 will be forced downwardly and the valve element 46 held unseated.

Leading downwardly from chamber 22 is a passage 49 within a plug 50 screwed into the lower end of the valve casing 18. This passage communicates with the lower end of a cylinder 54 formed in the lower part of casing 18 by means of passages 51, a chamber 52 surrounding the plug and a passage 53. Within this cylinder is a piston 55 backed by a strong spring 56. The inlet to the passage 49 is controlled by a valve element 57 carried on a fluted plunger 58, said plunger being acted upon by a spring 59 tending to unseat the valve element 57. The valve element 57 is normally held seated by the engagement of plunger 44 with plunger 58 since spring 59 is weaker than spring 45 which is interposed between plungers 33 and 44.

Also leading downwardly from chamber 23 is a passage 60 within a second plug 61 screwed into the lower end of the valve casing 18. This passage communicates, by means of passages 62, a chamber 63 surrounding the plug and a passage 64, with the lower end of a cylinder 65 parallel with cylinder 54. Within this cylinder is a piston 66 backed by a spring 67. The inlet to passage 60 is controlled by a valve element 68 carried on a fluted plunger 69, said plunger being acted upon by a spring 70 tending to unseat valve element 68. The valve element 68 is normally held seated by the engagement of plunger 47 with plunger 69 since spring 70 is weaker than spring 48 which is interposed between plungers 36 and 47.

Referring now to the operation of the valve structure, the parts of the valve mechanism will be in their positions indicated in the various figures when the steering mechanism is in a position where the dirigible wheels are straight ahead or within about a seventy degree turning angle. Under these conditions both valve elements 32 and 35 will be unseated by the action of springs 45 and 48. These springs will also maintain the valve elements 43 and 46 unseated and hold valve elements 57 and 68 seated against the bias of the weaker springs 59 and 70. The master cylinder device is thus in two-way communication with the fluid motors of both brakes and, therefore, the brakes can be applied and released by operation of the master cylinder device at will.

If the vehicle steering mechanism should be turned to the right so that the turning angle is somewhat greater than seventy degrees, then shaft 25 will be so turned in a counter-clockwise direction (as viewed from the top of Figure 2) that cam 38 on the face of the piston will force the valve element 32 to a seated position. This will close off passage 20 and fluid under pressure cannot be transmitted from the master cylinder device to the fluid motor of the left wheel brake. If the master cylinder device is operated, the right hand brake only will be operated, thus stopping or tending to stop the right hand wheel and aiding the operator in making a short turn with the vehicle since with the right hand wheel only being braked, the vehicle will tend to pivot around this wheel.

If the steering mechanism should be turned so as to make a short left hand turn (more than a seventy degree turning angle) shaft 25 will be turned sufficiently in a clockwise direction (as viewed from the top of Figure 2) that cam 38 on the piston will cause the closing of valve element 35. This will shut off communication between the master cylinder device and the right hand brake. When the master cylinder device is now operated, only the left hand brake will be applied, thus aiding the operator in making the short left hand turn.

If it should be desired at any time to manually control the selection of the brake which is not to be applied when the master cylinder is operated, this can be done by operation of the handle 27 and without regard to the condition of the steering mechanism. When handle 27 is turned in a clockwise direction from the central position shown in Figure 2, valve element 35 will be closed and only the left hand brake can be applied. When the handle is turned in a counter-clockwise direction, valve element 32 will be closed and only the right hand brake can be applied. The yieldable plungers 30 and 31 permit relative movement between the shaft and arm 28 connected by the steering mechanism whenever the handle is manually moved.

It is to be noted that during both automatic and manual rotation of the shaft 25 by the steering mechanism the valve elements 57 and 68 remain seated. Thus fluid under pressure cannot enter the cylinders 54 and 65 of the pressure accumulators.

If it should be desired to employ the braking system for parking the vehicle, that is, to maintain the brakes applied and permit the operator to leave the vehicle, this can be accomplished by merely raising the handle 27 to its vertical position, as shown in dotted lines in Figure 3. This will lift shaft 25 and piston 24 against the bias of the strong spring 39. With piston 24 in a raised position the springs 45 and 48 can expand and attain an uncompressed condition (free length) and no longer be effective to hold the valve elements 57 and 68 seated. The springs 59 and 70 can now unseat these valve elements 57 and 68 and thus place chamber 22 in communication with cylinder 54 and chamber 23 in communication with cylinder 65. The spring 59 will also be effective to seat valve element 43 and spring 70 to seat valve element 46, thus causing these valve elements to act as check valves to prevent return flow of fluid from the fluid motors to the master cylinder device. If the master cylinder device is now operated, fluid under pressure will be forced into the fluid motors of both brakes, thereby applying these brakes. Fluid under pressure will also be forced into cylinders 54 and 65, thereby moving pistons 55 and 66 upwardly against the bias of springs 56 and 67. If one stroke of the pedal is insufficient to place enough fluid under pressure in the system to compress springs 56 and 67, additional strokes may be made. Both brakes will now be held applied. If there should be slight leakage of fluid or contraction of fluid due to a change in temperature while the vehicle is parked with the brakes held applied, the brakes will not be released as springs 56 and 67 will continue to maintain the trapped-fluid under pressure. Each brake has its own separate pressure accumulator and thus if one stroke should be released by a large loss of fluid, the trapped fluid in the motor of the other brake will not be affected by such loss. It is, of course, obvious that a single accumulator could be employed for both brakes by merely connecting a single accumulator to the two passages 49 and 60, if such were desirable.

When it is desired to release the trapped fluid under pressure, all that need be done is to lower handle 27 to its horizontal position. This permits the strong spring 39 to be effective in moving piston 24 downwardly and again act on valve plungers 33 and 36 to cause unseating of valve elements 43 and 46 and a re-seating of valve elements 57 and 68. The trapped fluid will now be released and return to the master cylinder device. The fluid in the accumulators will also return to the master cylinder device as the fluid under pressure can unseat valve elements 57 and 68 sufficiently to permit fluid under pressure to flow past said valve element.

From the foregoing it is seen that there has been provided in a braking system, a valve mechanism which can be either automatically controlled by the steering mechanism or manually controlled by the operator to thus use the braking system to aid in steering. There is also incorporated in the valve mechanism, means for permitting the braking system to be used for parking purposes. Fluid under pressure can be maintained in the brake actuating fluid motors even if there is some decrease in volume of trapped fluid.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In control means for a vehicle having a brake on each side and provided with steering mechanism, a fluid pressure actuated system for the brakes, valve means associated with the system and operable when the steering mechanism is moved to turn the vehicle in one direction for causing the braking system when operated to apply only one of said brakes, other valve means associated with the system operable when the steering mechanism is moved to turn the vehicle in the other direction for causing the braking system when operated to apply only the other of said brakes, other valve means also associated with the system for trapping fluid under pressure in the braking system to thereby hold both brakes applied and means for controlling all the valve means by a single control member.

2. In control means for a vehicle having a brake on each side and provided with steering mechanism, a fluid pressure actuated system for the brakes, valve means associated with the system and operable when the steering mechanism is moved to turn the vehicle in one direction for causing the braking system when operated to apply only one of said brakes, other valve means associated with the system operable when the steering mechanism is moved to turn the vehicle in the other direction for causing the braking system when operated to apply only the other of said brakes, expansible chamber means associated with the braking system, other valve means operable at will for connecting the expansible chamber means with the system and for trapping fluid under pressure when developed in a portion of the system and the expansible chamber to thereby hold both brakes applied, and means for controlling all of the valve means by a single control member.

3. In a fluid pressure braking system for a vehicle having a brake on each side thereof and provided with a member for controlling the steering of said vehicle, fluid motors for actuating the brakes, a source of fluid pressure, conduit means for connecting the source to the motors, valve means interposed in the conduit means and operable by the steering mechanism when moved in one direction for cutting off the source of pressure from the fluid motor of the brake on one side of the vehicle and operable by the steering member when moved in another direction for cutting off the source of pressure from the fluid motor of the brake on the other side of the vehicle, means comprising a manually-operated member for controlling the valve means so as to selectively cut off either fluid motor from the source notwithstanding the position of the steering member, and other valve means operable by the manually-operated member for preventing release of fluid pressure from the motors, said manually-operated member when operating the other valve means being ineffective to control the first named valve means.

4. In a fluid pressure braking system for a vehicle having a brake on each side thereof and provided with a member for controlling the steering of said vehicle, fluid motors for actuating the brakes, a source of fluid pressure, conduit means for connecting the source to the motors, valve means interposed in the conduit means and operable by the steering mechanism when moved in one direction for cutting off the source of pressure from the fluid motor of the brake on one side of the vehicle and operable by the steering member when moved in another direction for cutting off the source of pressure from the fluid motor of the brake on the other side of the vehicle, means comprising a manually-operated member movable in a single plane for controlling the valve means so as to selectively cut off either fluid motor from the source notwithstanding the position of the steering member, and other valve means operable by the manually-operated member when moved in another plane for preventing release of fluid pressure from the motors, said manually-operated member when operating the other valve means being ineffective to control the first named valve means.

5. In a fluid pressure braking system for a vehicle having a brake on each side thereof and provided with a member for controlling the steering of said vehicle, fluid motors for actuating the brakes, a source of fluid pressure, conduit means for connecting the source to the motors, valve means interposed in the conduit means and operable by the steering member when moved in one direction for cutting off the source of pressure from the fluid motor of the brake on one side of the vehicle and operable by the steering member when moved in another direction for cutting off the source of pressure from the fluid motor of the brake on the other side of the vehicle, means comprising a manually-operated member for controlling the valve means so as to cut off either fluid motor from the source at will notwithstanding the position of the steering member, fluid pressure accumulator means, and other valve means operable by the manually-operated member for connecting the accumulator means with the motors and for preventing release of fluid pressure from the motors and accumulator means when fluid pressure has been developed therein.

6. In control means for a vehicle having a brake on each side and provided with steering mechanism, a fluid pressure actuated system for the brakes, a shut-off valve associated with the system for preventing one of the brakes from being applied when the system is operated, a second shut-off valve associated with the system for preventing the other brake from being applied when the system is operated, a rotatable member for selectively controlling the shut-off valves, means for rotating said member by the steering mechanism so that when said mechanism is operated to turn the vehicle in one direction one of the shut-off valves will be closed and when operated to turn the vehicle in the other direction the other shut-off valve will be closed, and valve means operable by an axial movement of said rotatable member for trapping fluid under pressure in the braking system to thereby hold both brakes applied, said axial movement of the rotatable member disabling the operation of the shut-off valves thereby.

7. In control means for a vehicle having a brake on each side and provided with steering mechanism, a fluid pressure actuated system for the brakes, a shut-off valve associated with the system for preventing one of the brakes from being applied when the system is operated, a second shut-off valve associated with the system for preventing the other brake from being applied when the system is operated, means comprising a rotatable member for selectively controlling the shut-off valves, means for rotating said member by the steering mechanism so that when said mechanism is operated to turn the vehicle in one direction one of the shut-off valves will be closed and when operated to turn the vehicle in the other direction the other shut-off valve will be closed, and manual means for moving the rotatable member axially to disable the operation of the shut-off valves by the rotatable member.

8. In control means for a vehicle having a brake on each side and provided with steering mechanism, a fluid pressure actuated system for the brakes, a shut-off valve associated with the system for preventing one of the brakes from being applied when the system is operated, a second shut-off valve associated with the system for preventing the other brake from being applied when the system is operated, means comprising a rotatable member for selectively controlling the shut-off valves, means for rotating said member by the steering mechanism so that when said mechanism is operated to turn the vehicle in one direction one of the shut-off valves will be closed and when operated to turn the vehicle in the other direction the other shut-off valve will be closed, manual means for moving the rotatable member axially to disable the operation of the shut-off valves by the rotatable member, and valve means automatically operable when the rotatable member is moved axially for trapping fluid under pressure in the system to thereby maintain the brakes applied.

9. In control means for a vehicle having a brake on each side and provided with steering mechanism, a fluid pressure actuated system for the brakes, a shut-off valve associated with the system for preventing one of the brakes from being applied when the system is operated, a second shut-off valve associated with the system for preventing the other brake from being applied when the system is operated, a rotatable member for selectively controlling the shut-off valves, means for rotating said member by the steering mechanism so that when said mechanism is operated to turn the vehicle in one direction one of the shut-off valves will be closed and when operated to turn the vehicle in the other direction the other shut-off valve will be closed, expansible chamber means, and other valve means operable by an axial movement of said rotatable member for connecting the expansible chamber with the system and for trapping fluid under pressure when developed in a portion of the system and the expansible chamber to thereby hold both brakes applied.

10. In a fluid pressure braking system for a vehicle having a brake on each side thereof and provided with a member for controlling the steering of said vehicle, fluid motors for actuating the brakes, a source of fluid pressure, conduit means for connecting the source to the motors, a shut-off valve operable by the steering mechanism when moved in one direction for cutting off the source of pressure from the fluid motor of the brake on one side of the vehicle, a second shut-off valve operable by the steering member when moved in another direction for cutting off the source of pressure from the fluid motor of the brake on the other side of the vehicle, an expansible chamber associated with each fluid motor, valve means for trapping fluid under pressure in each fluid motor and for connecting it to its associated expansible chamber, and manually-controlled means for simultaneously operating the two last named valve means so that fluid under pressure can be separately trapped in each fluid motor and be maintained under pressure by an expansible chamber.

11. In control means for a vehicle having a brake on each side and provided with steering mechanism, a fluid pressure actuated system for the brakes, a shut-off valve associated with the system for preventing one of the brakes from being applied when the system is operated, a second shut-off valve associated with the system for preventing the other brake from being applied when the system is operated, a rotatable member for selectively controlling the shut-off valves, means for rotating said member by the steering mechanism so that when said mechanism is operated to turn the vehicle in one direction one of the shut-off valves will be closed and when operated to turn the vehicle in the other direction the other shut-off valve will be closed, means comprising a manual member for rotating said member to selectively close the shut-off valves at will notwithstanding the condition of the steering mechanism, valve means for trapping fluid under pressure in the braking system to thereby hold both brakes applied, means for causing the last named valve means to be operative by an axial movement of the rotatable member, and means for moving the rotatable member axially by the manual member.

12. In a fluid pressure braking system for a vehicle having a brake on each side thereof and provided with a member for controlling the steering of said vehicle, fluid motors for actuating the brakes, a source of fluid pressure, conduit means for connecting the source to the motors, a shut-off valve operable by the steering mechanism when moved in one direction for cutting off the source of pressure from the fluid motor of the brake on one side of the vehicle, a second shut-off valve operable by the steering member when moved in another direction for cutting off the source of pressure from the fluid motor of the brake on the other side of the vehicle, manually-controlled means comprising a manual member movable in a single plane for selectively closing the shut-off valves at will, an expansible chamber associated with each fluid motor, valve means for trapping fluid under pressure in each fluid motor and for connecting it to its assoicated expansible chamber, and means controlled by a movement of the manual member in another plane for simultaneously operating the two last named valve means so that fluid under pressure can be separately trapped in each fluid motor and be maintained under pressure by an expansible chamber.

13. In control means for a vehicle having a brake on each side and provided with steering mechanism, a fluid pressure actuated system for the brakes, a shut-off valve associated with the system for preventing one of the brakes from being applied when the system is operated, a second shut-off valve associated with the system for preventing the other brake from being applied when the system is operated, a rotatable member provided with cam means for selectively closing the shut-off valves by rotation in opposite directions, means for rotating said member in one direction by the steering mechanism when said steering mechanism is operated to turn the vehicle in one direction and for rotating said member in the other direction when said steering mechanism is operated to turn the vehicle in the opposite direction, and means comprising a manually-operated member for moving said rotatable member and its cam means to a position where neither shut-off valve can be operated.

14. In control means for a vehicle having a brake on each side and provided with steering mechanism, a fluid pressure actuated system for the brakes, a shut-off valve associated with the system for preventing one of the brakes from being applied when the system is operated, a second shut-off valve associated with the system for preventing the other brake from being applied when the system is operated, a rotatable member provided with cam means for selectively closing the shut-off valves by rotation in opposite directions, means for rotating said member in one direction by the steering mechanism when said steering mechanism is operated to turn the vehicle in one direction and for rotating said member in the other direction when said steering mechanism is operated to turn the vehicle in the opposite direction, means comprising a manually-operated member for moving said rotatable member and its cam means to a position where neither shut-off valve can be operated, and valve means operable when the rotatable member is in its last named position for trapping fluid in the system for maintaining both brakes applied.

15. In control means for a vehicle having a brake on each side thereof, a fluid pressure actuated system for the brakes, a shut-off valve associated with the system for preventing one of the brakes from being applied when the system is operated, a second shut-off valve associated with the system for preventing the other brake from being applied when the system is operated, means comprising a rotatable member for selectively controlling the shut-off valves, a manual member for rotating said rotatable member, and valve means operable by an axial movement of said rotatable member for trapping fluid under pressure in the braking system to thereby hold both brakes applied.

16. In control means for a vehicle having a brake on each side thereof, a fluid pressure actuated system for the brakes, a shut-off valve associated with the system for preventing one of the brakes from being applied when the system is operated, a second shut-off valve associated with the system for preventing the other brake from being applied when the system is operated, means comprising a rotatable member for selectively controlling the shut-off valves, a manual member for rotating said rotatable member, means for moving the rotatable member in an axial direction by the manual member, and two valves operable by the axial movement of said rotatable member for trapping fluid under pressure in the braking system to thereby hold both brakes applied.

17. In a fluid pressure braking system for a vehicle having a brake on each side thereof, fluid motors for actuating the brakes, a source of fluid pressure, conduit means for connecting the source to the motors, a shut-off valve for cutting off the source of pressure from the fluid motor of the brake on one side of the vehicle, a second shut-off valve for cutting off the source of pressure from the fluid motors of the brake on the other side of the vehicle, manual means for selectively closing the shut-off valves, two chambers each having a yieldable wall, valve means for preventing return flow of fluid from one motor to the source and for placing said motor in communication with a chamber, other valve means for preventing return flow of fluid from the other motor to the source and for placing said motor in communication with the other chamber, and means operable by said manual means for controlling the last two named valve means, said manual means when controlling the last two named valves being ineffective to control the shut-off valves.

ARTHUR N. MILSTER.